United States Patent
Becker

[11] 3,815,550
[45] June 11, 1974

[54] FLOOR ASSEMBLY FOR ANIMAL ENCLOSURES

[75] Inventor: Julius C. Becker, Downs, Kans.

[73] Assignee: Becker Manufacturing Company, Incorporated, Downs, Kans.

[22] Filed: Sept. 5, 1972

[21] Appl. No.: 286,192

[52] U.S. Cl. ................................................. 119/28
[51] Int. Cl. ................................................. A01k 1/00
[58] Field of Search ............ 119/16, 19, 28; 52/586, 52/588

[56] References Cited
UNITED STATES PATENTS

| | | | |
|---|---|---|---|
| 386,997 | 7/1888 | Logan | 119/28 |
| 861,882 | 7/1907 | Noppel | 119/28 |
| 3,528,391 | 9/1970 | Johnson | 119/16 |
| 3,641,983 | 2/1972 | Keen et al. | 119/19 X |
| 3,677,229 | 7/1972 | Blough | 119/16 |
| 3,687,330 | 8/1972 | Herolzer | 119/19 X |
| 3,757,743 | 9/1973 | Lehe | 119/28 |

Primary Examiner—Hugh R. Chamblee
Attorney, Agent, or Firm—Schmidt, Johnson, Hovey & Williams

[57] ABSTRACT

A slatted floor assembly for farrowing pens or the like is adapted to be supported above a waste cleanout area. A set of elongated, tubular members made of a thermoplastic resin are held in a spaced, longitudinally parallel relationship by a plurality of underlying spacer elements that clip over and grip corresponding longitudinal projections which are integral to the members and extend laterally in opposite directions therefrom. The members, which are normally open ended, may be provided with conduit means placing all of the members, or only certain selected ones, in communication with one another and with a pump and a heating or cooling unit, in order that a temperature-controlling liquid may be circulated through the members for heating or cooling purposes.

5 Claims, 5 Drawing Figures

PATENTED JUN 11 1974    3,815,550
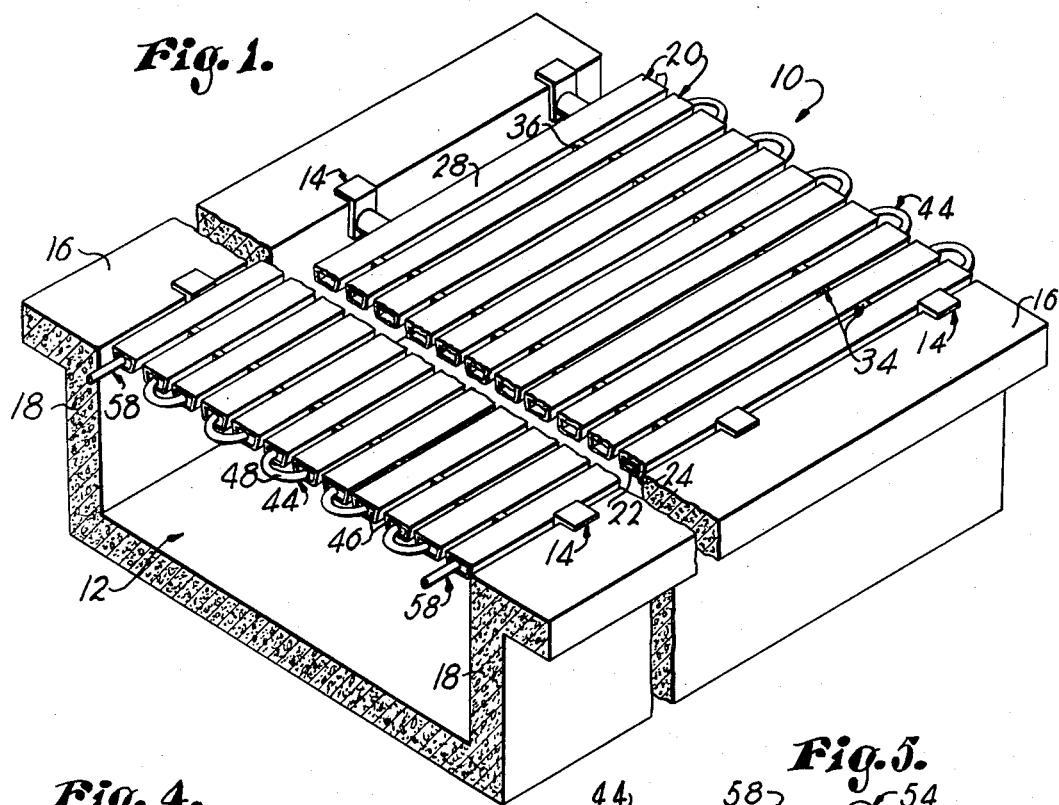
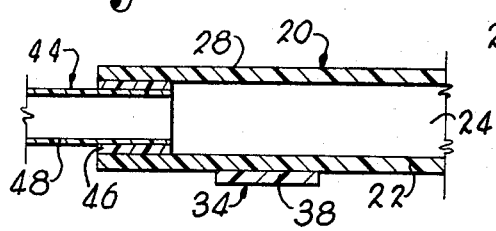
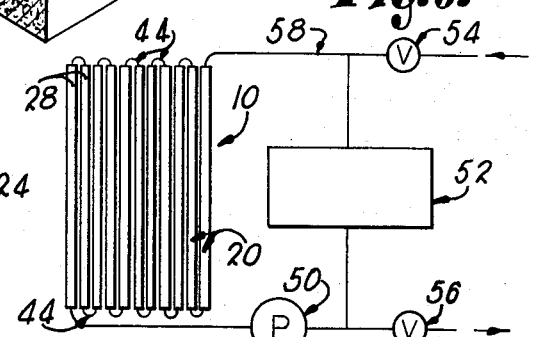
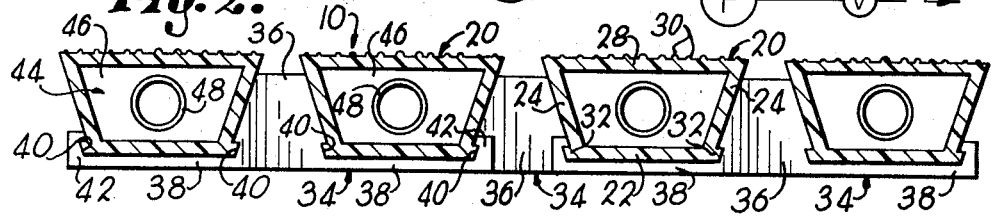
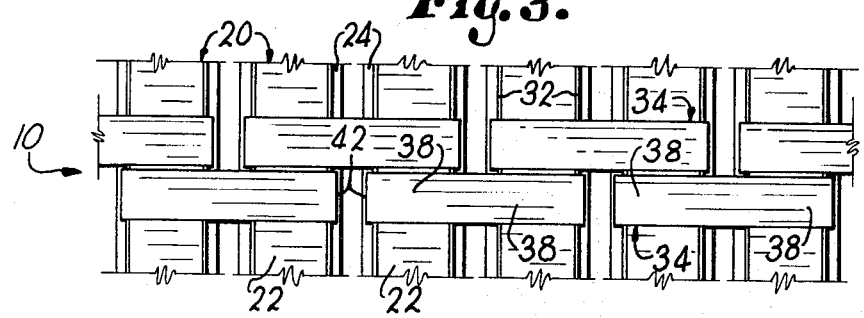

FLOOR ASSEMBLY FOR ANIMAL ENCLOSURES

This invention relates to a slatted floor assembly for animal enclosures such as hog farrowing pens and the like. As is well understood by those knowledgeable in the field of animal husbandry, it is important that proper environmental conditions be maintained, particularly, as for example, during and after the farrowing period of hogs. Not only is it important to control the temperature of the air at and near the floor but it has been found to be desirable to also control the temperature of the floor itself. In addition, the cleanliness of the floor area with respect to animal waste is important to the establishment of a healthy pig litter.

Coupled with the health aspect is the problem of manpower availability to maintain the pens in a clean condition, especially in those instances of high volume, commercial hog raising operations. The availability of labor for manually maintaining the cleanliness of the pens is practically nonexistent and that which is available is relatively expensive thus making it desirable that automatic waste disposal systems be employed.

It is, therefore, a very important object of this invention to provide a slatted floor assembly for animal enclosures and the like to which animal waste does not adhere therefore making it easier to maintain the cleanliness thereof.

It is another very important object of the invention to provide a floor that is not susceptible to corrosion therefore rendering it practically indestructible and insuring its durability over a long period of time.

A still further very important object of the invention is the provision of a floor which feels warmer than the conventional metal or concrete floors and which may be economically heated or cooled as required.

As a corollary to the just previously recited object, it is another important object of my invention to provide a floor assembly through which a temperature controlling medium may be circulated.

Yet another important object of the invention is to provide a slatted floor which is so constructed that no appreciable amount of waste is able to collect thereon.

Still another important object of the invention is the provision of a floor constructed of material that is not conducive to the support of bacterial growth.

A still further object of the invention is the provision of a slatted floor that may be easily and quickly installed with a minimum of hardware and which may be readily adapted to conform to any area of regular or irregular size and shape.

Yet another object of my invention is the provision of a slatted floor having a surface which provides sure footing for the animals thus alleviating sore knee problems.

In the drawing:

FIG. 1 is a fragmentary, perspective view showing the top, one side and one end of an elevated floor assembly for animal enclosures as it would appear when installed over a "clean-out" area;

FIG. 2 is an enlarged, vertical, transverse cross-sectional view showing a set of members maintained in a spaced, longitudinally parallel relationship by a plurality of elements to present a slatted floor, and further illustrating conduit means received in the ends of the members for placing the latter in communication with one another;

FIG. 3 is a slightly enlarged fragmentary, bottom view of a set of members illustrating the arrangement of a plurality of underlying elements which maintain the members in their spaced relationship;

FIG. 4 is an enlarged, fragmentary, vertical, longitudinal, cross-sectional view showing a member with its respective conduit, plug and tubular fitting; and FIG. 5 is a schematic diagram of a slatted floor assembly in conjunction with a system for circulating either hot or cold liquid through the tubes, the system preferably being operated as a closed loop type in order to re-circulate the liquid.

A slatted floor, broadly designated by the numeral 10, is provided for animal enclosures such as hog farrowing pens and the like and is especially suited for installation above a waste retention or disposal area, generally designated by the numeral 12. The floor assembly 10 is normally supported above the area 12 by a series of supports 14 underlying the floor 10 and adapted to rest on the upper edges or copings 16 of opposed side walls 18 of the clean-out area 12. The clean-out area 12 as seen in FIG. 1 is illustrative of but one type of installation, it being understood that the floor assembly 10 may be associated with other kinds of clean-out areas requiring an elevated floor support.

The floor assembly 10 includes a set of elongated, tubular, plastic members 20 which preferably are extruded but may be molded or otherwise formed in any desirable thickness. It has been found that a thermoplastic resin such as polyvinyl cloride, commonly referred to as PVC, is ideally suited for use in making the members 20 because of its virtually indestructible characteristics, resistance to corrosion and because of its being easily cleaned. The members 20 are preferably polygonal when viewed in vertical, transverse cross section to present a generally trapezoidal shaped configuration having a bottom wall 22, upwardly and outwardly slopping opposed side walls 24 and a top wall 28 which, if desired, may be provided with longitudinal molded ribs 30. Also included as an integral structural part of each member 20 are a pair of longitudinal projections 32 extending laterally in opposite directions along the lower outer margins of the members 10 and which are, in effect, extensions of the lower wall 22.

A plurality of clip-like elements 34 maintain the members 20 in a spaced, longitudinally parallel relationship to form the floor assembly 10. The elements 34 are provided with a central, upright spacer 36 and a pair of arms 38 which extend in opposite directions from the spacer 36 and normally underly a pair of adjacent members 20. Holding means in the form of notches 40 which cooperate with corresponding projections 32 on the members 20 are disposed at the outer ends 42 of the oppositely extending arms 38 and in the spacer 36 to releasably receive and exteriorly grip their respective members 20.

The spacer 36 is normally disposed between the two adjacent members 20 and has a vertical, transverse cross section complementary to that of the member 20, as is best seen in FIG. 2. The size of the spacer 36 will depend upon the ultimate use but it is here suggested that they be of a size to present anywhere from a three-eighths inch to a one inch spacing between the members 20 at the latter's top wall 28. It is recommended that the elements 34 also be made of a thermoplastic resin such as PVC.

The tubular nature of the members 20 permits circulation of a temperature controlling medium, such as a liquid, through the assembly 10 for heating or cooling purposes. The members 20 are placed in communication with one another through the use of conduit means 44 provided at each end of the members 20 and which are comprised of a pair of end plugs 46 for each pair of members 20 to be interconnected and a tubular fitting 48 interconnecting each pair of plugs 46, the fitting 48 being suitably bonded into the pair of plugs 46 and the latter in turn being suitably bonded into the ends of a pair of members 20. As is shown schematically in FIG. 5, the assembly 10 with its plurality of conduit means 44 is connected to a liquid re-circulating means which is comprised of a pump 50, a unit 52 capable of either heating or cooling the liquid to a desired temperature, inlet and outlet valves 54 and 56 respectively and a network of interconnecting transmission lines 58. The valves 54 and 56 may be so set (closed) to present a closed loop re-circulating system. While the drawing illustrates each of the members 20 having provision for the circulation of liquid therethrough, it is to be understood that it would be possible to provide longer fittings 48 such that the conduit means 44 would place every other member 20 in communication with one another. Other combinations could also be used depending upon the users requirements.

In use, a set of members 20, which may be easily cut to any desired length, are arranged to conform with the area over which the floor is to be placed and are held in a spaced, longitudinally parallel relationship by the elements 34 to present the floor assembly 10 which is supported in its entirety by the underlying supports 14 as seen in FIG. 1. It is recommended that the underlying supports 14 be placed beneath the assembly 10 at three foot intervals while the elements 34 with their spacers 36 be disposed longitudinally along the members 20 and in gripping engagement with their respective projections 32 at two feet intervals. This spacing is suggestive only and will depend on the relative size and strength of the members and elements. In referring to FIG. 3, it will be seen that each element 34 engages two members 20 in a manner that adjacent elements 34 are in engagement with and grip a common member 20 to form the continuous floor assembly 10.

Upon the completion and placement of the floor assembly 10 the conduit means 44 are installed at each end of the members 20 and connected to the pump 50 and heating or cooling unit 52 by the lines 58 as shown in FIG. 5. The floor assembly 10 is charged with a liquid such as water, from a source (not shown) through manipulation of the valves 54 and 56.

The floor assembly 10 as here presented has proven to have many advantages over conventional steel, aluminum or concrete floors in that animal waste does not adhere to the plastic material as readily as it does to the other mentioned materials and is therefore easier to clean. In this connection it must also be noted that the corrosion resistant nature of the plastic material results in a floor assembly having a much longer effective life than does a floor assembly made of one of the previously mentioned materials. Not to be overlooked is the relatively inert nature of the plastic material which makes it less likely to support bacterial growth than is flooring constructed of wood, steel, concrete or the like. Experience has shown that the animals keep the floor cleaner in that their feet tend to work the waste through the slots and into the waste retention area 12.

The tubular construction of the members 20, in addition to their liquid containing capability, are exceptionally strong and are of adequate strength to support even the largest hogs and its nonskid, ribbed surface offers sure footing to the animals. The fact that the members 20 are light in weight and the ease with which the notches 40 in the element 34 snap over the projections 32 of the members 20 provides for relatively effortless and quick assembly of the floor 10.

A further significant feature of the floor assembly 10 is its capability of having a temperature controlled liquid circulated therethrough for purposes of controlling the temperature of the floor as well as the immediately adjacent areas. The easily inserted end plugs 46 with the fittings 48 permits the circulation of water, that has been heated by the unit 52, through the members 20 to protect the animals from chill. If conditions warrant, the unit 52 may be of the kind that will cool the water rather than heat it to provide economical cooling of the floor assembly and its proximal areas. Aside from the fact that temperature controlling liquid may be circulated through the members 20 it should also be noted that the very nature of the resilient plastic floor "feels" warmer than metal or concrete and as such minimizes unnecessary chill to the animals.

It is to be understood that minor modifications may be made in the invention as described and illustrated without departing from the true spirit of this invention. Accordingly, the invention should be limited only by the fair scope of the following claims.

Having thus described the invention, what is claimed as new and desired to be secured by Letters Patent is:

1. A slotted floor for animal enclosures particularly adapted for installation and use in overlying relationship to a waste material receiving area, said floor including:

a plurality of elongate, tubular, plastic members each having top, bottom and opposed side walls;

longitudinal flange means on and extending outwardly from each side wall of each member adjacent the bottom of the latter; and a plurality of separate, elongate, plastic clip and support elements disposed beneath and transversely to said members and each having first and second, longitudinally spaced pairs of longitudinally spaced and opposed notch presenting means, each of said pairs of notch presenting means receiving and gripping said opposite flange means on the side walls of a corresponding member to hold the members received by each element in laterally spaced, parallel relationship to each other with a waste clearing slot therebetween and in communication with said receiving area therebeneath, each adjacent pair of said elements being offset from each other both laterally thereof and longitudinally of said members and overlapped with each other longitudinally thereof, each adjacent pair of said elements receiving and gripping a member common to said pair of elements, whereby said members are all retained by said elements in predetermined spaced relationship to each other to present said slotted floor.

2. A floor as claimed in claim 1, wherein said notch presenting means of said elements are resiliently yieldable to permit reception of said members by said elements during assembly of the floor, and said elements are yieldable between said notch presenting means of each pair thereof for biasing of each pair of notch presenting means toward each other and into tighter gripping relationship with the member received thereby in response to the weight of said member and animals supported by the latter.

3. A floor as claimed in claim 1, wherein each of said elements includes an upstanding portion between said pair of notch presenting means therein and engageable with the proximate side wall of each of said pair of members received by said element for further supporting said pair of members in said spaced relationship.

4. A floor as claimed in claim 3, wherein each of said members is of generally trapezoidal transverse configuration with the shorter base at the bottom thereof, and each of said upstanding portions is of generally trapezoidal configuration with the shorter base at the top thereof, the zones of engagement between said upstanding portions and said proximate side walls being substantially complementary.

5. A floor as claimed in claim 1, wherein said top, bottom and side walls of each member define an open ended, uninterrupted passage therethrough, and there are provided means for effecting a fluid coupling between adjacent open ends of at least certain of said members to present a closed fluid path through said certain members, and means for circulating a temperature controlling fluid through said path.

* * * * *